(12) United States Patent
Manoselvam et al.

(10) Patent No.: US 11,379,549 B2
(45) Date of Patent: Jul. 5, 2022

(54) PLATFORM FOR DETECTING BYPASS OF AN AUTHENTICATION SYSTEM

(71) Applicant: Accenture Global Solutions Limited, Dublin (IE)

(72) Inventors: Vicknesh Manoselvam, Singapore (SG); Kevin Koh Tian Seng, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 172 days.

(21) Appl. No.: 16/889,225

(22) Filed: Jun. 1, 2020

(65) Prior Publication Data
US 2020/0380058 A1     Dec. 3, 2020

(30) Foreign Application Priority Data
Jun. 3, 2019    (SG) ............................ 10201905038S

(51) Int. Cl.
    *G06F 11/34*        (2006.01)
    *G06F 16/955*      (2019.01)
    *G06F 21/31*        (2013.01)

(52) U.S. Cl.
    CPC ...... *G06F 16/9566* (2019.01); *G06F 11/3438* (2013.01); *G06F 21/316* (2013.01)

(58) Field of Classification Search
    CPC .................................................. G06F 16/955
    See application file for complete search history.

(56) References Cited

U.S. PATENT DOCUMENTS

| | | | |
|---|---|---|---|
| 9,396,316 B1* | 7/2016 | Altman | ............... H04L 63/102 |
| 9,973,500 B2 | 5/2018 | Podal et al. | |
| 10,051,001 B1 | 8/2018 | Ashley et al. | |
| 10,671,731 B2* | 6/2020 | Furuya | ................. G06F 21/32 |
| 2007/0136809 A1 | 6/2007 | Kim et al. | |
| 2011/0162051 A1* | 6/2011 | Li | ..................... H04L 63/0876 |
| | | | 726/5 |

(Continued)

FOREIGN PATENT DOCUMENTS

CN             101471774       7/2009

OTHER PUBLICATIONS

SG Search Report and Written Opinion in Singapore Appln. No. 10201905038S, dated Jul. 29, 2021, 8 pages.

*Primary Examiner* — Di Xiao
(74) *Attorney, Agent, or Firm* — Fish & Richardson P.C.

(57) ABSTRACT

Implementations are directed to detecting bypass of an authentication system of a web application with actions including receiving one or more webpage logs including web traffic associated with a web application during a defined time period, receiving one or more authentication logs associated with one or more authentication appliances providing authentication services for the web application, determining, based on the one or more webpage logs, one or more webpage log entries corresponding to a user and the defined time period, determining, based on the one or more authentication logs, a total number of correct authentication factors provided by the user during the defined time period, and determining, based on the one or more webpage log entries corresponding to the user and the defined time period and the total number of correct authentication factors provided by the user, that the user bypassed an authentication system of the web application.

20 Claims, 5 Drawing Sheets

(56) References Cited

U.S. PATENT DOCUMENTS

| | | |
|---|---|---|
| 2014/0373130 A1 | 12/2014 | de Oliveira et al. |
| 2015/0288715 A1* | 10/2015 | Hotchkiss ........... H04L 63/0876 726/7 |
| 2017/0111383 A1 | 4/2017 | Most et al. |
| 2018/0046796 A1 | 2/2018 | Wright et al. |
| 2018/0189470 A1* | 7/2018 | Kim ....................... G06F 21/45 |
| 2018/0324209 A1 | 11/2018 | Zhang |
| 2019/0036879 A1 | 1/2019 | Isola et al. |
| 2021/0168148 A1* | 6/2021 | Boodaei ................ H04L 63/102 |

* cited by examiner

PLATFORM FOR DETECTING BYPASS OF AN AUTHENTICATION SYSTEM

CROSS-REFERENCE TO RELATED APPLICATION

This application claims priority under 35 U.S.C. § 119 to Singapore Patent Application No. 10201905038S, filed on Jun. 3, 2019, the entire contents of which is incorporated herein by reference.

TECHNICAL FIELD

Implementations of the present disclosure are directed to detection of online security breaches. More particularly, implementations of the present disclosure are directed to an authentication bypass detection (ABD) platform that leverages webpage logs and authentication logs to detect bypass of an authentication system.

BACKGROUND

Technological advancement in online security has led to more frequent use of authentication systems as a basis for security of web applications. Authentication systems provide online security by requiring a user of a web application to provide one or more pieces of evidence that confirm the user's identity prior to granting the user access to the requested information. In many instances, multi-factor authentication systems that require provision of multiple items of authentication evidence are used to improve security and identity verification. However, online authentication systems are still subject to weaknesses. For example, loopholes in the authentication system may enable a person to access a secured web application without providing one or more pieces of the required authentication evidence. In addition, it is difficult to detect a successful bypass of an authentication system after the bypass has already occurred, which makes preventing future bypasses challenging.

SUMMARY

Implementations of the present disclosure are directed to the detection of online security bypasses. More particularly, implementations of the present disclosure are directed to an authentication bypass detection (ABD) platform that leverages webpage logs and authentication logs to detect bypass of an authentication system.

In general, innovative aspects of the subject matter described in this specification can be embodied in methods that include operations of: receiving one or more webpage logs including web traffic associated with a web application during a defined time period, receiving one or more authentication logs associated with one or more authentication appliances providing authentication services for the web application, the one or more authentication logs including one or more time-stamped authentication factor entries for the one or more authentication appliances, determining, based on the one or more webpage logs, one or more webpage log entries corresponding to a user and the defined time period, determining, based on the one or more authentication logs, a total number of correct authentication factors provided by the user during the defined time period, and determining, based on the one or more webpage log entries corresponding to the user and the defined time period and the total number of correct authentication factors provided by the user, that the user bypassed an authentication system of the web application. Other implementations of this aspect include corresponding systems, apparatus, and computer programs, configured to perform the actions of the methods, encoded on computer storage devices.

These and other implementations may each optionally include one or more of the following features: each authentication log entry corresponding to the user indicates a correct authentication factor provided by the user; determining that the user bypassed the authentication system of the web application includes: determining, based on the one or more webpage log entries corresponding to the user and the defined time period, one or more uniform resource locators (URLs) associated with the web application and accessed by the user during the defined time period, obtaining one or more tables, each of the one or more tables including a mapping between each of the one or more URLs and a number of authentication factors required for the user to access to each of the one or more URLs, determining, based on the one or more URLs and the one or more tables, an expected number of authentication factors for the user for the defined time period, and determining, based on the expected number of authentication factors for the user for the defined time period and the total number of correct authentication factors provided by the user during the defined time period, that the total number of correct authentication provided by the user during the defined time period is less than the expected number of authentication factors for the user for the defined time period; the number of authentication factors required for the user to access to each of the one or more URLs and a type of authentication factors required for the user to access to each of the one or more URLs are controllable by the user; actions further include generating a score for the user based on the user's conformance with one or more categories of web browsing behavior; the one or more categories of web browsing behavior include at least one of multiple bypasses, anomalous URLs, previous flagging of the user, blacklisted Internet protocol address, foreign Internet protocol address, and failure to provide any valid authentication information; and conformance with at least one of the one or more categories of web browsing behavior indicates an intentional bypass of the authentication system of the web application.

Other implementations of any of the above aspects include corresponding systems, apparatus, and computer programs that are configured to perform the actions of the methods, encoded on computer storage devices. The present disclosure also provides one or more nontransitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide various technical advantages and/or technical improvements. By correlating webpage logs of users of a web application with one or more authentication logs containing authentication factor entries provided by the respective users, bypass of an authentication system of a web application by one or more users can be detected. In addition, bypass detection in accordance with implementations of the present disclosure enables frequent and rapid detection of security breaches, as the webpage logs and authentication logs may be analyzed frequently to identify all bypasses that have occurred during a defined period of time. By providing a platform for post-breach bypass detection, implementations enable the identity of the user conducting the bypass to be readily determined. By determining the identity of a bypassing user, preventative measures can be taken to prevent future bypasses by the same user. Further, implementations of the present disclosure help improve the security of authentication systems by identifying potential weaknesses of the authentication systems. In this manner, weaknesses can be corrected to prevent future bypasses of the same nature as those detected.

Traditionally, it has been difficult to detect that a bypass of an authentication system has occurred when the bypass is successful. In addition, even if the authentication bypass is detected, it can be challenging to determine the identity of the person that conducted the bypass. In traditional authentication systems, an attempt to bypass the authentication system is typically only detected when the attempt is unsuccessful (e.g., incorrect authentication evidence is provided) or when the bypass is reported by a user of the web application (e.g., the bypass is reported by a user of the web application based on suspicious activity related to the user's account). Implementations of the present disclosure provide an improved method for detecting bypasses of authentication systems using webpage logs and authentication logs. For example, webpage logs and authentication logs can be used to determine whether any of the users accessing the web application during a defined time period failed to provide one or more items of authentication evidence.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DETAILED DESCRIPTION

Figure 1:
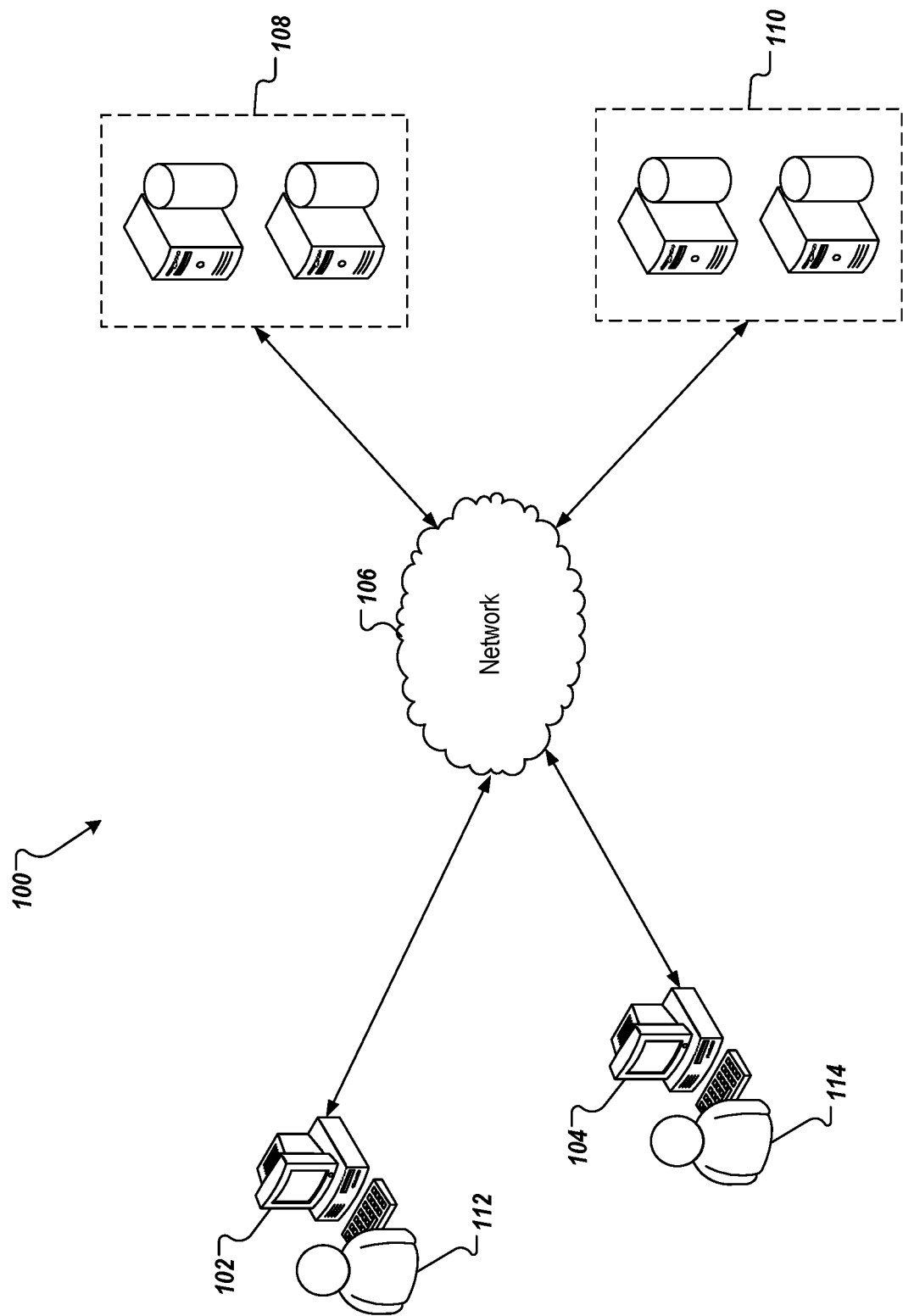
FIG. 1 depicts an example architecture that can be used to execute implementations of the present disclosure.

Implementations of the present disclosure are directed to detection of online security breaches. More particularly, implementations of the present disclosure are directed to an authentication bypass detection (ABD) platform that leverages webpage logs and authentication logs to detect bypass of an authentication system. Implementations can include actions of receiving one or more webpage logs including web traffic associated with a web application during a defined time period, receiving one or more authentication logs associated with one or more authentication appliances providing authentication services for the web application, the one or more authentication logs including one or more time-stamped authentication factor entries for the one or more authentication appliances, determining, based on the one or more webpage logs, one or more webpage log entries corresponding to a user and the defined time period, determining, based on the one or more authentication logs, a total number of correct authentication factors provided by the user during the defined time period, and determining, based on the one or more webpage log entries corresponding to the user and the defined time period and the total number of correct authentication factors provided by the user, that the user bypassed an authentication system of the web application. Other implementations of this aspect include corresponding systems, apparatus, and computer programs, configured to perform the actions of the methods, encoded on computer storage devices.

To provide further context for implementations of the present specification, and as introduced above, online authentication systems, such as multi-factor authentication systems, provide security for web applications. Multi-factor authentication can require a person to verify their identity through the submission of one or more pieces of evidence prior to granting the person access to all or portions of a web application. For example, in order to access a secure web application, a user may be required to provide a first piece of authentication evidence (a first authentication factor), such as a password, and, based on the provision of a correct first authentication factor, may be required to provide a second piece of authentication evidence (a second authentication factor), such as an answer to a security question previously provided by the user.

While authentication systems can be effective for securing online information, authentication systems are not a perfect security solution. For example, authentication systems, including multi-factor authentication systems, can include loopholes, defects, or blind spots that can be exploited by persons seeking to gain unauthorized access to a web application. In order to improve the authentication system and prevent breaches, successful bypasses of the authentication system should be identified. As introduced above, successful authentication bypasses are typically only identified if a person performing the bypass participates in suspicious activity using the application. For example, a successful bypass of an authentication system for an online banking system may not be detected unless a person conducting the bypass manipulates another user's bank account information or funds, and the other user reports this unauthorized activity. This method of bypass detection relies heavily on users of the web application monitoring their online information and accounts and reporting suspicious activity. Many users may be slow to report suspected bypasses or may fail entirely to report suspected bypasses, resulting in inefficient detection of bypasses, if any. In many instances, rapid detection of authentication bypasses is needed to mitigate damage caused by users bypassing the authentication system. Relying on user reporting for detection of an authentication bypass will often be too slow to effectively respond to a bypass by a user.

In further detail, and as introduced above, traditional detection of successful authentication bypasses only detects a bypass after the person that bypassed authentication has performed unauthorized activity within the application.

These unauthorized activities can have severe consequences, such as a user's identification information or financial assets being stolen. In some instances, a malicious person attempting to bypass an authentication system may conduct multiple successful bypass attempts without performing any additional unauthorized activity with the web application in order to ensure that the application can be successfully breached. Traditional bypass detection fails to detect breaches that do not result in any additional unauthorized activity on the web application, outside of the breach itself. However, detection of these "silent" authentication bypasses would help in the prevention of future bypasses and would help identify the user that performed the bypass (also referred to herein as the bypassing user). This would allow the bypassing user to be blocked from the application before conducting unauthorized activities.

In addition, traditional bypass detection generally ignores the activity of non-malicious users who are not attempting to actively bypass the authentication system. However, the activity of non-malicious users of the authentication system could be relevant to being able to detect defective operation of the authentication system or the web application and to repairing such defects. For example, detection of when a non-malicious user of the authentication system is granted access to the web application despite failing to provide one or more of the relevant authentication factors could be useful in identifying defects in the authentication system of the web application.

As introduced above, and as described in further detail herein, implementations of the present disclosure are directed to detecting bypasses of an authentication system for a web application, such as a multi-factor authentication system. Detecting authentication system bypasses is useful in numerous applications. Example applications include, without limitation, authentication systems for online banking applications, national identity systems, and social media applications. Implementations of the present disclosure provide for detection of authentication bypass without requiring third-party reporting of unauthorized activity. More particularly, implementations of the present disclosure utilize webpage logs and authentication logs to identify bypasses of an authentication system of a web application during a defined time period.

FIG. 1 depicts an example architecture 100 in accordance with implementations of the present disclosure. In the depicted example, the example architecture 100 includes one or more client devices 102, 104, a network 106, and a server systems 108, 110. The server systems 108, 110 each include one or more server devices and databases (e.g., processors, memory). In the depicted example, respective users 112, 114 interact with the client devices 102, 104. In an example context, the users 112, 114 can include users requesting access to a secure web application provided by the server system 108. The users 112, 114 can be required to provide authentication information to an authentication system provided by the server system 110 in order to gain access to the secure web application.

In some examples, the client devices 102, 104 can communicate with the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 108, 110 each include at least one server and at least one data store. In the example of FIG. 1, the server systems 108, 110 are intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, the server system 110 can host an ABD platform (e.g., provided as one or more computer-executable programs executed by one or more computing devices). For example, the user 112 can request access to a web application provided by the server 108. In response to the request, the user may be required to provide one or more items of authentication information (i.e., authentication factors) to one or more authentication appliances provided by one or more servers 108, 110 in order to verify the identity of the user. As explained in further detail herein, the authentication factors provided by the user 112 can one or more webpage logs of the ABD platform to determine whether the user 112 bypassed the authentication system of the web application.

Figure 2:
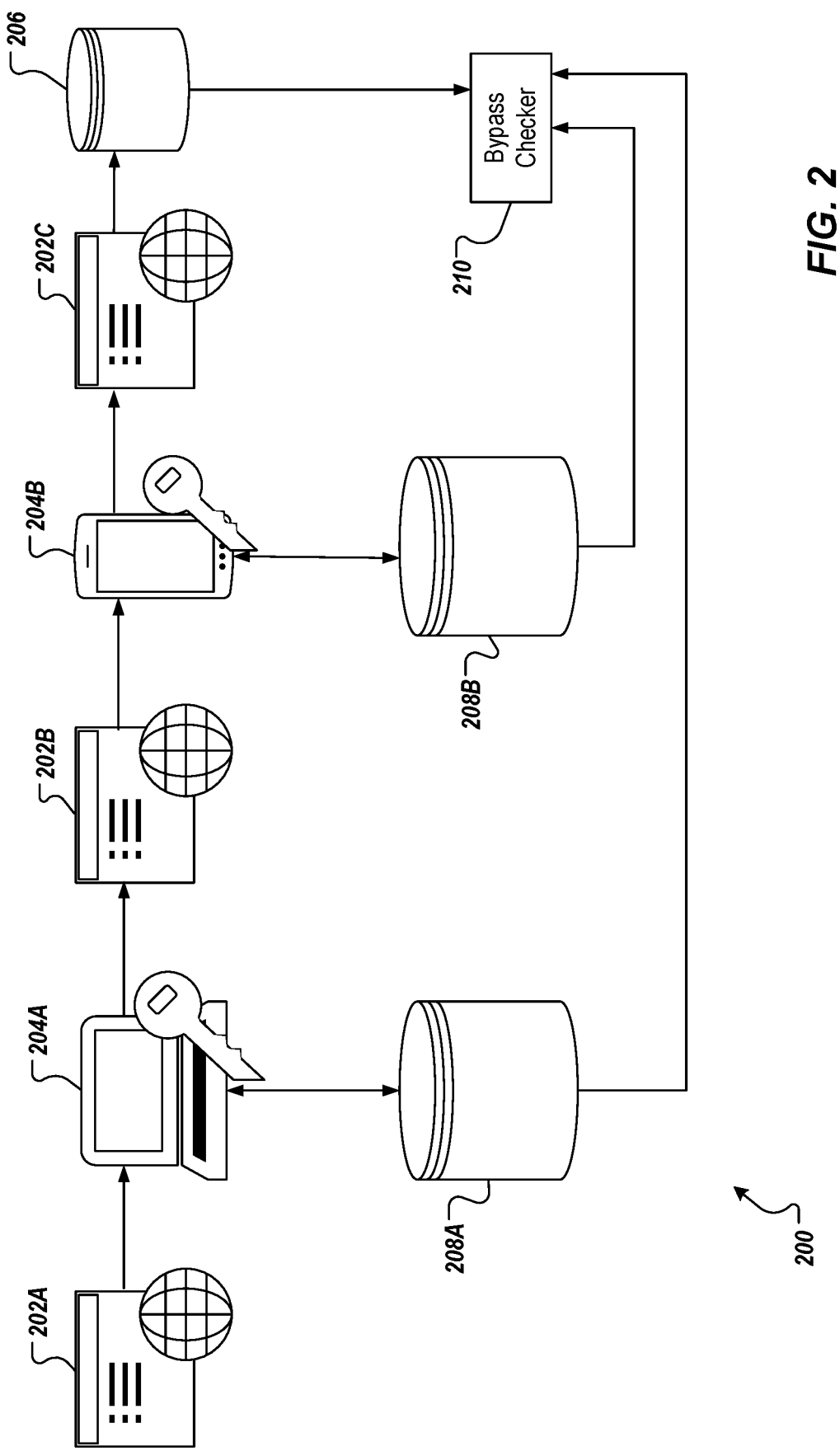
FIG. 2 depicts an example conceptual diagram for authenticating an identity of a user in accordance with implementations of the present disclosure.

FIG. 2 depicts an example conceptual diagram 200 for authenticating the identity of a user (e.g., the user 112 of FIG. 1) in order to grant the user access to a secure portion 202C of a web application. As depicted in FIG. 2, the user can navigate to a first webpage 202A. The user can request access to a particular secure portion 202C of the web application (e.g., an online bank account) through a user interface of the first webpage 202A. Upon requesting access to the secure portion 202C of the web application, the user is prompted to provide a first piece of authentication information as a first authentication factor. For example, the user 220 may be required to provide a username and a password on the first webpage 202A. In some implementations, the authentication system is used to secure portions of the web application includes of one or more authentication appliances 204A, 204B. In some examples, the authentication system is separate from the web application and is hosted on a separate server from the web application.

In some implementations, a first authentication appliance 204A (e.g., displaying the first webpage 202A) receives the authentication information entered by the user for the first authentication factor. It is determined whether the authentication information provided by the user is correct. In some implementations, entry of the first authentication factor is recorded in the first authentication factor login database 208A, and the entry includes an indication whether the information provided was correct or incorrect. In some implementations, the first authentication factor login database 208A only records the entry of the first authentication factor if the authentication information provided by the user for the first authentication factor was correct. In some implementations, the first authentication factor login database 208A includes an entry for each attempted entry for the first authentication factor provided to the authentication appliance 204A by a user.

In some implementations, upon determining that the user entered correct authentication information for the first authentication factor, a second webpage 202B prompts the user to enter a second item of authentication information corresponding to a second authentication factor. In some implementations, the second authentication factor is received by a second authentication appliance 204B. In some examples, the second authentication factor is provided to the second authentication appliance 204B in the form of an answer to a personal question. In some implementations, a code is sent as an SMS message to the second authentication appliance 204B (e.g., a mobile device), and the second authentication factor requires the user enter the code from the SMS message into a field on the second webpage 202B. Various other types of authentication factors that may be required including, but not limited to, biometric factors (such as, fingerprint, voice, facial), and knowledge factors (such as, a personal identification number (PIN), answers to security questions).

In some implementations, a second authentication factor login database 208B associated with the web application receives authentication information provided by the user for the second authentication factor. It is determined whether the authentication information provided by the user is correct. In some implementations, entry of the second authentication factor is recorded in the second authentication factor login database 208B, and the entry includes an indication whether the information provided was correct or incorrect. In some implementations, the second authentication factor login database 208B only records entry of the second authentication factor if the authentication information provided by the user for the second authentication factor is correct. In some implementations, the second authentication factor login database 208B includes an entry for each attempted entry for the second authentication factor provided to the authentication appliance 204B by a user.

In some implementations, the authentication factor login databases 208A, 208B associated with the authentication appliances 204A, are maintained in one or more servers (such as servers 108, 110 of FIG. 1).

Upon determining that the user has provided the correct authentication information for both the first authentication factor and the second authentication factor, the user is provided access to the secure portion 202C of the web application. In some implementations, each of the URLs accessed by the user during the process of authentication, including the URL corresponding the secure portion 202C of the web application, (i.e., the user's browsing history within the web application) are recorded in a webpage log stored in a database 206 associated with the web application.

As described in further detail herein, the authentication logs stored on each of the authentication factor login databases 208A, 208B and the webpage logs stored on the server 206 associated with the secure web application may be periodically provided to an ABD platform of the present disclosure (e.g., hosted on servers 108, 110 of FIG. 1). The ABD platform of the present disclosure processes the log data to determine, based on the webpage logs and the authentication logs, whether any bypass of the authentication system of the application has occurred during the time period captured in the webpage logs and authentication logs.

In view of the above context, and as described in further detail herein, implementations of the present disclosure provide an ABD platform for detecting one or more bypasses of online authentication systems. In some implementations, the ABD platform detects bypasses of a secure web application authentication system based on one or more webpage logs and one or more authentication logs associated with the secure web application. In some implementations, the ABD platform uses one or more tables providing a mapping between specific webpages and the number of authentication factors required for the user to access each webpage.

Figure 3:
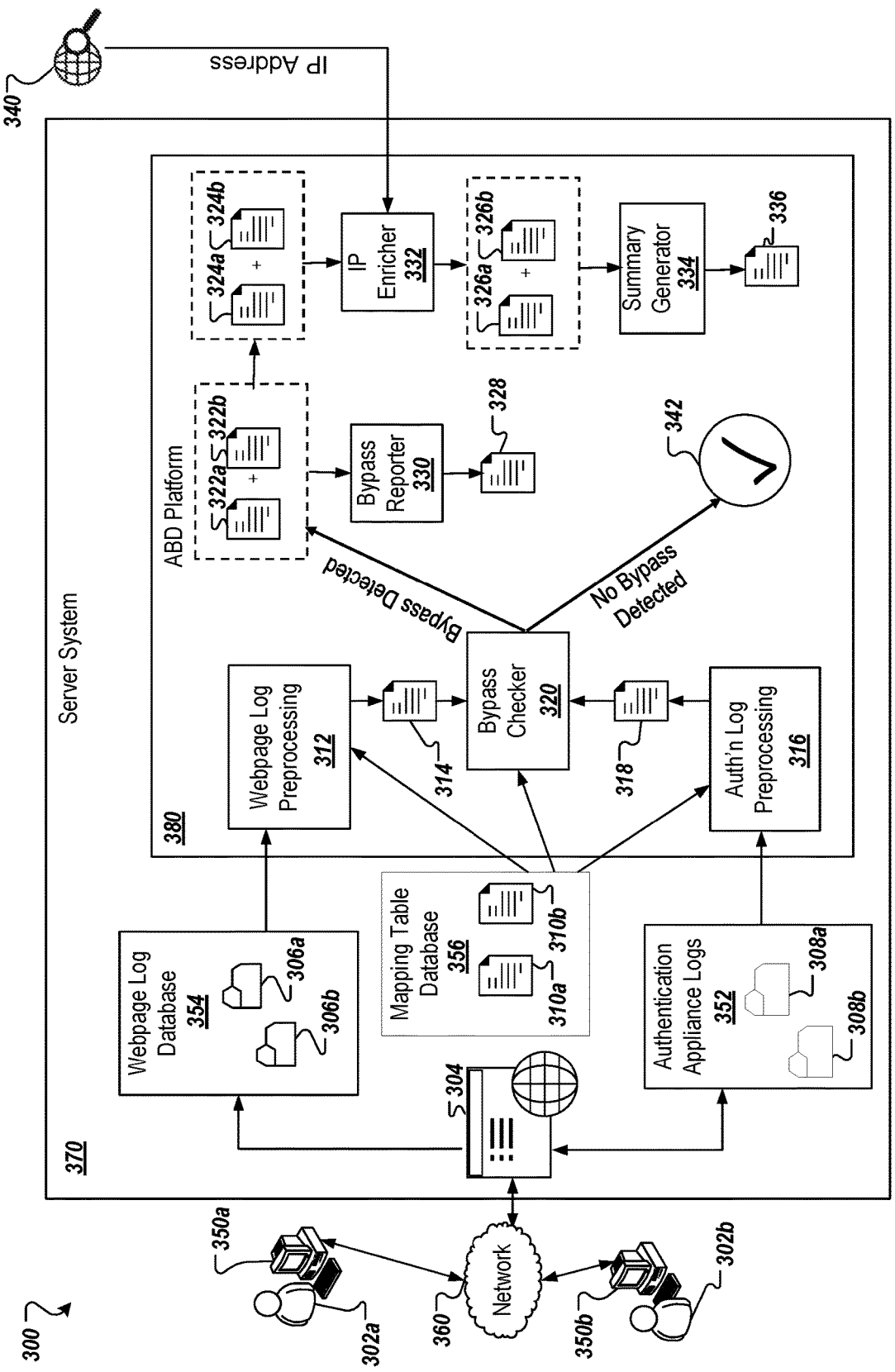
FIG. 3 depicts an example conceptual architecture that can be used to execute implementations of the present disclosure.

FIG. 3 depicts an example conceptual architecture 300 in accordance with implementations of the present disclosure. In the depicted example, the example conceptual architecture 300 includes one or more user devices 350a, 350b, a network 360, and a server system 370. The server system 370 includes one or more server devices and databases (e.g., processors, memory). In the depicted example, respective users 302a, 302b (referred to collectively as users 302 or generically as user 302) interact with the user devices 350a, 350b. In an example context, the users 302 can include users of a secure web application 304 hosted by the server system 370. In some implementations, the secure web application 304 is protected by an authentication system. In the depicted example, an ABD platform 380 is hosted by the server system 370 and is used to detect bypasses of the authentication system of the secure web application 304.

In some examples, the user devices 350a, 350b communicate with the server system 370 over the network 360. In some examples, the user devices 350a, 350b can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 360 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 370 includes at least one server and at least one data store. In the example of FIG. 3, the server system 370 is intended to represent various forms of servers including, but not limited to a web server, an application server, a proxy server, a network server, and/or a server pool. In general, server systems accept requests for application services and provides such services to any number of client devices (e.g., the client devices 350a, 350b over the network 360).

In accordance with implementations of the present disclosure, the server system 370 can host the secure web application 304 and the ABD platform 380. In some implementations, the users 302 interact with the secure web application 304 over the network 360 using user devices 350a, 350b. For example, a user 302 can submit a request for access to the secure web application 304 over the network 360 using user device 350a.

In some implementations, the secure web application 304 communicates with one or more authentication appliance logs 352. For example, the secure web application 304 may protect user information through an authentication system that requires users (such as users 302) to provide one or more pieces of authentication evidence (i.e., authentication factors) in order to access all or portions of a secure web application 304. In some implementations, verification of authentication information provided by the users 302 is conducted by the web application 304. In some implementations, each authentication factor provided by the users 302 is verified for accuracy.

In some implementations, the authentication appliance logs 352 include one or more authentication logs 308a, 308b. In some implementations, the authentication logs 308a, 308b include entries identifying each time a user of the secure web application 304 provides an item of authentication evidence. In some examples, entries include an indication of whether the authentication information provided by the user 302 was correct or incorrect. In some implementations, the authentication logs 308a, 308b include entries identifying each time a user of the secure web application 304 provided a correct item of authentication evidence. In some examples, the authentication logs 308a, 308b include a timestamp for each entry corresponding to a user of the web application 304 providing a correct authentication factor. In some implementations, the entries of the authentication logs 308a, 308b include identifier information provided by the users 302 as part of the authentication process, such as usernames associated with the individual users 302. The authentication appliance logs 352 can store authentication log data using any suitable data storage format. In some implementations, the entries of the authentication logs 308a, 308b provide an indication of which authentication factor entry was being attempted by a user. For example, the entries of the authentication logs 308a, 308b can indicate whether a user was providing authentication information for a first authentication factor or a second authentication factor. In some implementations, the authentication logs 308a, 308b include metadata related to the user's provision of authentication information, such as the IP address for the device used to provide the respective authentication information. In some examples, the authentication log 308a, 308b entries includes information indicating the profile of the device used to provide the respective authentication information.

In some implementations, the secure web application 304 is in communication with a webpage log database 354. In the depicted example, the webpage log database 354 includes a plurality of webpage logs 306a, 306b. In some examples, the webpage logs 306a, 306b store uniform resource locators (URLs) for each of the webpages accessed by users 302 within the secure web application 304. For example, if a user 302 accesses three different webpages within the web application 304, each of the three URLs corresponding to the three webpages accessed by the user 302 will be stored in the webpage logs 306a, 306b. In some examples, each of the webpage logs 306a, 306b includes the web traffic for the secure web application 304 for a defined period of time, such as the previous 24 hours or the previous hour. In some implementations, the entries in the webpage logs 306a, 306b each include a timestamp corresponding to the time that the identified user accessed a webpage at the identified URL. In some implementations, the entries of the webpage logs 306a, 306b include identifier information provided by the users 302 as part of the authentication process, such as the usernames associated with the individual users 302. In some implementations, the webpage logs 308a, 308b include metadata indicating the IP address of the device accessing the respective webpages. In some implementations, the entries of the webpage logs 306a, 306b include metadata that indicates a profile of the computing device used by the user to access the respective URL. The webpage log database 354 can store the webpage log data using any suitable data storage format.

In accordance with implementations of the present disclosure, and as noted above, the server system 370 can host the ABD platform 380 for detecting bypasses of an authentication system. In the depicted example, the ABD platform 380 includes a webpage log preprocessing module 312, an authentication log preprocessing module 316, a bypass checker module 320, a bypass reporter module 330, an internet protocol (IP) enricher module 332, and a summary generator module 334. As described in further detail herein, the ABD platform 380 is used to determine whether one or more users have bypassed the authentication system of the secure web application 304. In the depicted example, the ABD platform 380 receives data from the webpage log database 354, the authentication appliance log(s) 352, and a mapping table database 356. The data received by the ABD platform is processed to detect one or more bypasses of the authentication system of the secure web application 304.

In some examples, the mapping table database 356 stores one or more mapping tables 310a, 310b. In some examples, the mapping tables 310a, 310b include correlations between one or more webpages of the web application 304, as identified by corresponding URLs, each user 302 of the application 304, and a number of authentication factors expected to be provided in order for a particular user 302 to access each of the one or more webpages. In some implementations, the expected number of authentication factors required to access a webpage is specific to each user 302. For example, when initially creating an account for the secure web application 304, a user 302 may be able to select the number of authentication factors required to access certain webpages of the web application 304. For example, a user 302 may be able to control the number and type of authentication factors required to access a webpage containing the user's 302 personal information.

In some implementations, the webpage log preprocessing module 312 of the ABD platform 380 receives the webpage logs 306a, 306b stored on the webpage log database 354. In some examples, the webpage log preprocessing module 312 processes the webpage logs 306a, 306b to generate a clean and tagged webpage log 314. In some implementations, the webpage log preprocessing module 312 receives one or more mapping tables 310a, 310b stored in the mapping table database 356. In some examples, the webpage log preprocessing module 312 uses the correlations between webpages, users, and anticipated numbers of authentication factors contained in the mapping tables 310a, 310b to tag each of the webpage log entries with an expected number of authentication factors. For example, if the webpage logs 306a, 306b include an entry indicating user 302 accessed a webpage at a specific URL ("URL A"), the preprocessing module 312 utilizes the mapping tables 310a, 310b to determine the expected number of authentication factors to be provided by user 302 in order for the user 302 to access to the webpage at URL A and tags the entry with the expected number of authentication factors. In some implementations, the webpage log preprocessing module 312 tags each webpage log entry with the expected number of authentication factors, and compiles the tagged entries into a clean and tagged webpage log 314. In some implementations, the clean and tagged webpage log 314 is provided to the bypass checker module 320. In some implementations, metadata is extracted from the webpage logs 306a, 306b and used to generate the clean and tagged webpage log 314. In some implementations, each entry of the clean and tagged webpage log 314 include one or more of a URL, a timestamp, an identifier for the user (i.e., user ID), the web application being accessed, the type of authentication factor required for the respective URL (e.g., first authentication factor, second authentication factor, etc.), and the expected number of authentication factors.

In some implementations, the authentication log preprocessing module 316 of the ABD platform 380 receives the authentication logs 308a, 308b stored on the authentication log database 352. In some examples, the authentication log preprocessing module 312 processes the authentication logs 308a, 308b to generate a clean and tagged authentication log 318. In some implementations, the authentication log preprocessing module 316 receives one or more mapping tables 310a, 310b stored on a mapping table database 356 to be used during the preprocessing of the authentication logs 308a, 308b and generation of the clean and tagged authentication log 318. In some implementations, metadata is extracted from the authentication logs 308a, 308b and used to generate the clean and tagged authentication log 318. In some implementations, each entry of the clean and tagged authentication log 318 includes one or more of a timestamp, an identifier for the user (i.e., user ID), the type of authentication factor provided (e.g., first authentication factor, second authentication factor, etc.), and the web application being accessed and the expected number of authentication factors.

In the depicted example, the clean and tagged webpage log 314 and the clean and tagged authentication log 318 are provided to the bypass checker module 320 to determine whether any bypasses of the authentication system of the web application 304 provided by the authentication appliances 352 have occurred. In some implementations, the bypass checker module 320 determines all of the entries in the clean and tagged webpage log 314 and in the clean and tagged authentication log 314 corresponding to a single user 302 for a defined period of time. For example, the bypass checker module 320 can determine all of the entries contained in the clean and tagged webpage log 314 and in the clean and tagged authentication log 314 corresponding to user 302 for the prior 24 hour period.

In some implementations, the bypass checker module 320 determines, based the clean and tagged webpage log 314, the total number of expected authentication factors for the user 302 for a defined time period. For example, the bypass checker module 320 can determine the total number of expected authentication factor entries for the user 302a for the prior 24 hours by identifying all of the entries in the clean and tagged webpage log 314 associated with the user 302 and having a timestamp within the last 24 hours. The bypass checker module 320 can add together all of the expected authentication factors tagged in the webpage log entries 313 corresponding to the user 302 to generate a total number of anticipated authentication factors for the user 302 for the prior 24 hours.

In some examples, the bypass checker module 320 determines, based the clean and tagged authentication log 318, the total number of correct authentication factors provided by the user 302 for a defined time period. For example, the bypass checker module 320 can determine the total number of entries in the authentication log 318 that indicate that the user 302 provided a correct authentication factor and that have a timestamp within the defined time period. In some implementations, the authentication log 318 only includes entries of correct authentication factors, and total number of correct authentication factors provided by the user can be determined based on the total number of entries in the authentication log 318 corresponding with the user.

In some implementations, the bypass checker module 320 compares the total number of expected authentication factors with the clean and tagged authentication log 318 to determine whether a user bypassed the authentication system of the web application 304. If the total number of correct authentication factor entries in the authentication log 318 corresponding with the user for the defined period is less than the expected number of authentication factors for the user for the defined period based on the tagged webpage log 314, the bypass checker module 320 identifies the user 302 as having committed a bypass of the authentication system of the web application 304. If the total number of correct authentication factor entries in the authentication log 318 corresponding to the user for the defined period is equal to the expected number of authentication factors for the user for the defined period based on the tagged webpage log 314, the user 302 is identified as not having committed a bypass of the authentication system of the web application (342).

In some implementations, the bypass checker module 320 receives the webpage logs 306a, 306b and authentication logs 308a, 308b directly from the webpage log database 354 and the authentication appliance log(s) 352 without any preprocessing. In some implementations, the bypass checker module 320 determines each of the entries in the webpage logs 306a, 306b and the authentication log 308a, 308b corresponding with the user 302 for a defined time period. For example, in some implementations, the bypass checker module 320 determines each of the entries contained in the webpage logs 306a, 306b and in the authentication logs 308a, 308b associated with a single user 302 for the prior 24 hour period. In some examples, the bypass checker module 320 receives the mapping tables 310a, 310b from the mapping table database 356. In some implementations, the bypass checker module 320 determines the total number of expected authentication factors expected for the user 302 for the defined period based on the correlations in the mapping tables 310a, 310b between the webpages contained in the webpage log entries 306a, 306b corresponding to the user and the defined time period, and the expected number of authentication factors for the user for each webpage. The bypass checker module 320 can determine the total number of authentication factor entries in the authentication logs 308a, 308b corresponding to the user 302 and having a timestamp during the defined period. The bypass checker module 320 can then compare the expected number of authentication factors for the user 302 for the defined period with the total number of correct authentication factor entries for the user 302 for the defined time period. As previously discussed, if the total number of correct authentication factor entries for the user for the defined time period is less than the expected number of authentication factors for the user for the time period, the bypass checker module 320 identifies the user 302 as having committed a bypass of the authentication system of the web application 304. If the total number of correct authentication factor entries for the user for the defined period is equal to the expected number of authentication factors for the user for the time period, the user 302 is identified as not having committed a bypass of the authentication system of the web application (342).

In some implementations, the webpage log 306a, 306b entries and authentication log 308a, 308b entries corresponding to each user are identified, and the above described process for identifying an authentication bypass is performed for each user 302 who accessed the web application 304 during the defined period.

In some implementations, the bypass checker module 320 generates a webpage log bypass report 322a. In some examples, the webpage log bypass report 322a includes the webpage log 306a, 306b entries corresponding to one or more bypassing users 302.

In some implementations, the bypass checker module 320 generates an authentication log bypass report 322b. In some examples, the authentication log bypass report 322b includes the authentication log entries corresponding to one or more bypassing users 302.

In some implementations, the ABD platform 380 includes a bypass reporter module 330. In some implementations, the bypass reporter module 330 receives the webpage log bypass report 322a and authentication log bypass report 322b. In some implementations, the bypass reporter module 330 analyzes the webpage log bypass report 322a and the authentication log bypass report 322b to determine one or more errors in the webpage log bypass report 322a and authentication log bypass report 322b. In some examples, the bypass reporter module 330 generates an error log 328 based on errors in the webpage log bypass report 322a and authentication log bypass report 322b. In some implementations, the error log 328 includes the corresponding username and timestamp for each of the erroneous entries in the webpage log bypass report 322a and authentication log bypass report 322b. In some implementations, an error log 328 is generated for each user of the system and each error log 328 contains all anomalous data detected for a single user from the webpage log bypass report 322a and the authentication log bypass report 322b.

In some examples, the ABD platform 380 includes an IP (Internet protocol) enricher module 332. In some implementations, the webpage log bypass report 322a and authentication log bypass report 322b are provided to an IP enricher module 332. In the depicted example, a copy of the webpage log bypass report 324a and a copy of the authentication log bypass report 324b are provided to an IP enricher module 332. In some implementations, the IP enricher module receives data from the Internet 340 regarding each of the IP addresses included in the webpage log bypass report 324a. Data received by the IP enricher module 332 from the Internet 340 can include information regarding whether any of the IP addresses contained in the webpage bypass log report 324a are blacklisted, anomalous, directed to a webpage that no longer exists, or correspond to a foreign IP address based on geolocation. In some examples, the IP enricher module 332 enriches the webpage log bypass report 324a and the authentication log bypass report 324b with the data received from the Internet 340. In some implementations, the IP enricher module 332 generates an enriched webpage log bypass report 326a and an enriched authentication log bypass report 326b based on the data received for the Internet 340.

In some implementations, the ABD platform 380 includes a summary generator module 334. In some implementations, the enriched webpage log bypass report 326a and the enriched authentication log bypass report 326b are provided to the summary generator module 334. For example, the summary generator module 334 can generate a bypass summary 336 based on enriched webpage log bypass report 326a and the enriched authentication log bypass report 326b.

In some implementations, the bypass summary 336 includes a score for each user 302 identified as having committed a bypass during the defined period. In some implementations, the bypass score for each user is determined based on the user's conformance with one or more of categories of web browsing behavior. For example, if a user 302 is identified in the enriched webpage log bypass report 326a and the enriched authentication log bypass report 326b as having committed multiple bypasses during the defined period, the suspected bypass score for the user will be increased. In some examples, each bypass identified for a single user in the enriched webpage log bypass report 326a and the enriched authentication log bypass report 326b increases the user's suspected bypass score. For example, if the enriched webpage log bypass report 326a and the enriched authentication log bypass report 326b include three suspected bypasses for a single user 302, the user's 302 suspected bypass score will be increased by three points.

In some implementations, any URLs contained in the enriched webpage log reports 326a corresponding to a foreign IP address will increase the suspected bypass score of the corresponding user 302. In some examples, any user 302 that had been previously identified as a suspected bypassing user increases the user's 302 suspected bypass score. In some implementations, any URLs contained in the enriched webpage log reports 326a corresponding to a blacklisted IP address will increase the suspected bypass score of the corresponding user 302. In some examples, failure of the user 302 to provide any valid login during the defined period will increase the user's 302 suspected bypass score.

In some examples, anomalous URLs contained in the enriched webpage log report 326a will increase the suspected bypass score of the corresponding user 302. For example, if a user 302 provided authentication data for a first eService, but accessed a second (different) eService, the eService mismatch will increase the user's 302 suspected bypass score.

In some implementations, the user's 302 suspected bypass score is calculated based on the user's conformance with number of categories of suspicious activities (e.g., multiple bypasses, accessing blacklisted IP addresses, etc.). For example, if the enriched webpage log bypass report 326a and the enriched authentication log bypass report 326b indicate that the user 302 accessed one or more blacklisted IP addresses and committed multiple bypasses, the user's suspected bypass score would be a 2 based on the user's 302 conformance with two categories of suspicious web browsing activity.

In some examples, the suspected bypass score is calculated based on the number of individual instances of suspicious web browsing activity contained within the enriched webpage log bypass report 326a entries and the enriched authentication log bypass report 326b entries corresponding with the user 302. For example, if the enriched webpage log bypass report 326a and the enriched authentication log bypass report 326b indicate that the user 302 accessed two blacklisted IP addresses and committed three bypasses during the defined period, the user's suspected bypass score would be a 5 based on the five instances of suspicious web browsing activity corresponding with the user 302. In some instances, a suspected bypass score above a threshold score indicates a high likelihood of authentication bypass.

Figure 4A:
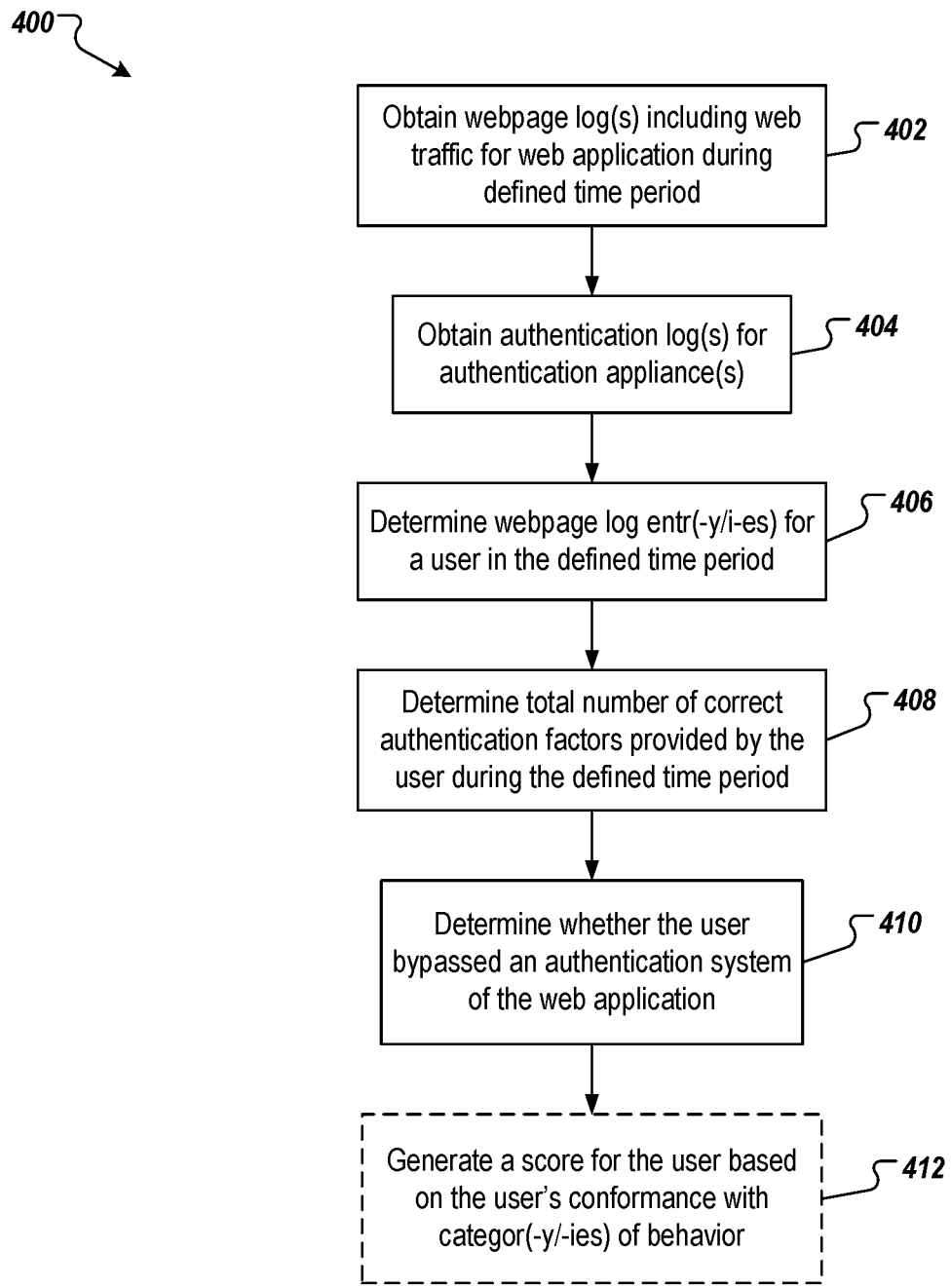
FIGS. 4A and 4B depict example processes that can be executed in accordance with implementations of the present disclosure.

FIG. 4A depicts an example process 400 that can be executed in accordance with implementations of the present disclosure. In some implementations, the example process 400 is provided using one or more computer-executable programs executed by one or more computing devices. For example, the example process 400 can be executed by an ABD platform of the present disclosure.

One or more webpage logs including traffic associated with a web application during a defined time period are obtained (402). In some implementations, the one or more webpage logs are stored on a database in communication with the web application (such as webpage log database 354 of FIG. 3). In some implementations, the one or more webpage logs are obtained from a database over a network.

In some implementations, the one or more webpage logs include data regarding web traffic associated with a web application during a defined time period. For example, the webpage logs can store each of the uniform resource locators (URLs) corresponding to each of the webpages accessed by one or more users of the web application during the defined time period. In some implementations, each of the webpage log entries include a timestamp corresponding to the time that a user accessed the webpage at the identified URL. In some implementations, the entries of the webpage logs each include an identifier (such as a username) provided by the corresponding user as part of the authentication process. In some implementations, the webpage logs include metadata indicating the IP address of the device accessing the respective webpages. In some implementations, the entries of the webpage logs include metadata that indicates a profile of the computing device used by the user to access the respective URL.

One or more authentication logs associated with one or more authentication appliances providing authentication services for the web application are obtained (404). In some implementations, the one or more authentication logs are stored in one or more authentication appliance logs that are in communication with the web application (such as authentication appliance log(s) 352 of FIG. 3). In some implementations, the one or more webpage logs are obtained from one or more authentication appliance logs over a network.

In some implementations, the authentication logs include authentication factor entries identifying each time a user of the secure web application provided an item of authentication evidence to the authentication appliance(s). In some implementations, each of the authentication log entries are timestamped. In some examples, the authentication log entries include an indication of whether the authentication information provided by the user was correct or incorrect. In some examples, the authentication logs only store entries corresponding to the provision of correct authentication evidence, and, each authentication log entry indicates a correct authentication factor provided by a user. In some implementations, each of the authentication log entries include an identifier (such as a username) provided by the corresponding user as part of the authentication process. In some implementations, the entries of the authentication provide an indication of which authentication factor entry was being attempted by a user. For example, the entries of the authentication logs can indicate whether a user was providing authentication information for a first authentication factor or a second authentication factor. In some implementations, the authentication logs include metadata related to the user's provision of authentication information, such as the IP address for the device used to provide the respective authentication information. In some examples, the authentication log entries includes information indicating the profile of the device used to provide the respective authentication information.

One or more webpage log entries corresponding to a user in the defined time period are determined (406). In some implementations, the one or more webpage log entries corresponding to a user and the defined time period are determined by identifying each of the webpage log entries that contain a username associated with the user and a timestamp within the defined time period. In some implementations, the webpage logs contain all of the web traffic for the webpage for the defined time period, and determining one or more webpage log entries corresponding to a user and the defined time period includes identifying each of the entries in the webpage logs corresponding to the individual user.

A total number of correct authentication factor entries provided by the user during the defined time period is determined (408). In some implementations, the total number of correct authentication factor entries provided by the user during the defined time period is determined based on the one or more authentication logs. For example, the total number of correct authentication factor entries provided by the user during the defined time period can be determined by identifying the total number of authentication log entries containing a username associated with the user, an indication that the authentication factor provided was correct, and a timestamp within the defined time period. In some implementations, the authentication logs only store entries corresponding to provision of correct authentication evidence, and determining the total number of correct authentication factor entries provided by the user during the defined time period is achieved by identifying the total number of authentication log entries that contain the username associated with the user and have a timestamp within the defined time period.

Whether the user bypassed an authentication system of the web application is determined (410). In some implementations, the determination of whether the user bypassed the authentication system is based on the one or more webpage log entries corresponding to the user and the defined time period and the total number of correct authentication factors provided by the user during the defined period.

Figure 4B:
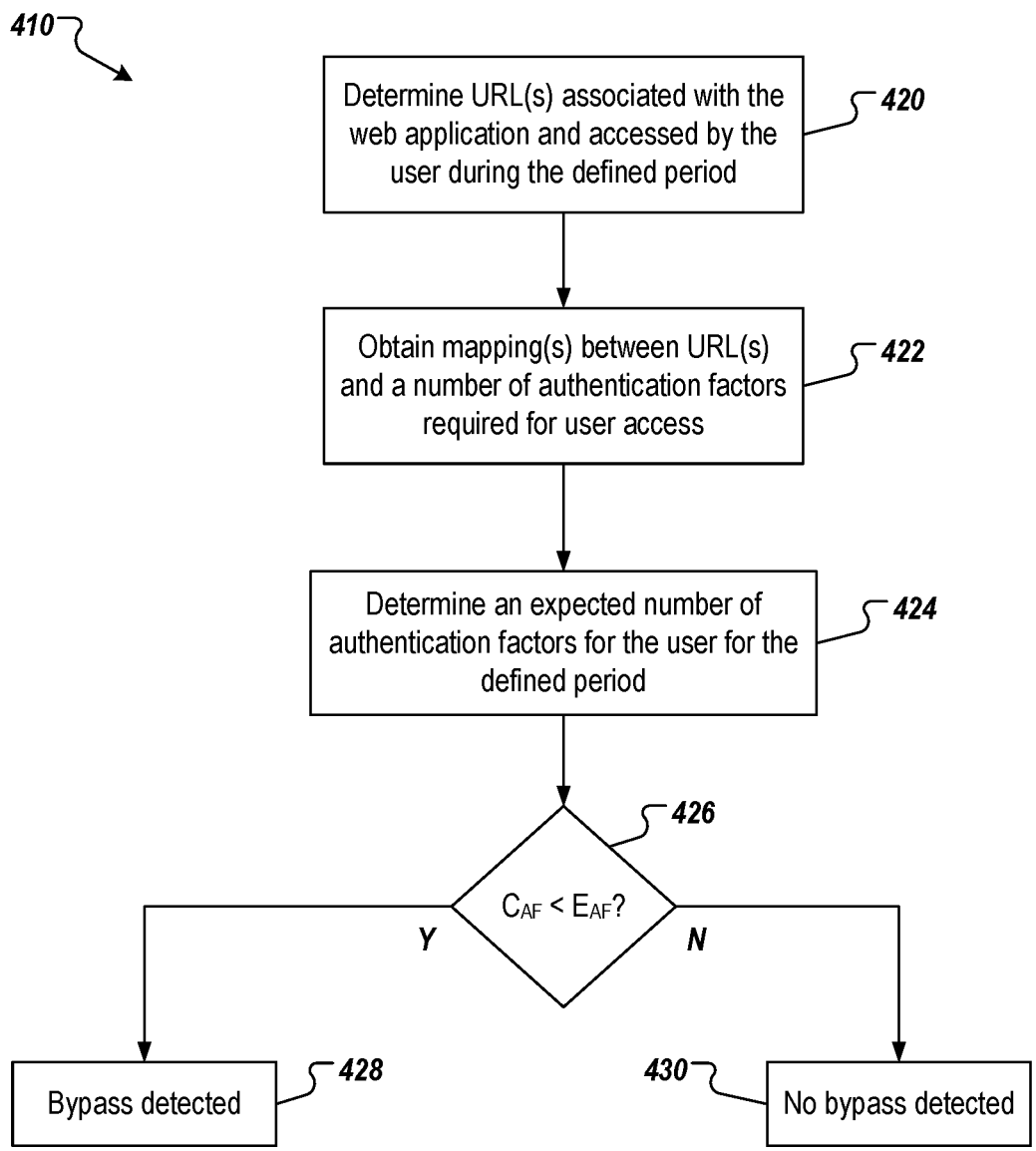

FIG. 4B depicts an example process 410 for determining whether a user bypassed an authentication system of a web application. In some implementations, the example process 410 is provided using one or more computer-executable programs executed by one or more computing devices. For example, the example process 410 can be executed by an ABD platform of the present disclosure.

One or more uniform resource locators (URLs) associated with the web application and accessed by the user during the defined time period are determined (420). In some implementations, the URLs accessed by the user are determined based on the one or more webpage log entries corresponding to the user and the defined time period (420). As previously discussed, in some implementations, the webpage logs store uniform resource locators (URLs) corresponding to each of the webpages accessed by users of the web application during the defined time period. In some implementations, each of the webpage log entries include a timestamp corresponding to the time that an identified user accessed the webpage at the identified URL. In some implementations, each of the webpage log entries include an identifier (such as a username) provided by the user as part of the authentication process. In some examples, the one or more URLs accessed by the user during the defined time period are determined by identifying the URL contained in each entry of the webpage logs corresponding with the user and having a timestamp within the defined time period.

One or more mappings between URL(s) and a number of authentication factors required for user access are obtained (422). In some implementations, one or more mapping tables contain a mapping between each of the URLs associated accessed by the user and a number of authentication factors required for the user access to each of the webpages corresponding to the URLs. In some implementations the one or more mapping tables are stored on a database (such as, mapping table database 356 of FIG. 3). In some implementations, the one or more mapping tables are obtained from a database over a network.

An expected number of authentication factors for the user for the defined period is determined (424). In some implementations, the expected number of authentication factors is determined based on the one or more URLs accessed by the user during the defined time period and the mappings in the mapping table(s). As previously discussed, mappings contained in the mapping table(s) between each of the URLs accessed by the user during the defined time period and a number of authentication factors required for access the user to access each of the webpages corresponding to the URLs can be used to determine an expected number of authentication factors for the user for the defined period. For example, based on the mappings in the mapping table(s), a number of authentication factors expected to be provided by the user for each of the identified URLs can be determined and added together to determine a total number of expected authentication factors for the user for the defined period.

For example, if the webpage log(s) include entries indicating that the user accessed two webpages during the defined time period (a first webpage at "URL A" and a second webpage at "URL B"), the mapping tables can be used to determine the number of authentication factors expected to be provided by the user to access to the webpages at URL A and at URL B (for example, one factor and two factors, respectively). The expected authentication factor requirements for each of URL A and URL B can be added together to determine a total number of expected authentication factors for the user for the defined period (e.g., five total authentication factors expected).

In some implementations, the expected number of authentication factors for each webpage is specific to each user. For example, when initially creating an account for the secure web application, a user may be able to select the number of authentication factors required to access certain webpages of the web application.

In some examples, the correlations between webpages, users, and anticipated numbers of authentication factors contained in the mapping tables are used during preprocessing of the webpage logs. For example, the mappings in the mapping tables can be used to tag each of the webpage log entries with an expected number of authentication factors based on the user and webpage identified in each of the entries. In some implementations, the tagged webpage log entries are used to determine a total number of expected authentication factors for the user for the defined time period.

The expected number of authentication factors for the user for the defined period and the total number of correct authentication factors provided by the user during the defined period are compared to determine whether the user provided fewer correct authentication factors than the expected number of authentication factors (426). In some implementations, if the total number of correct authentication factors provided by the user during the defined period is less than the expected number of authentication factors for the user for the defined period, the user is identified as having committed a bypass of the authentication system. In some implementations, if the total number of correct authentication factors provided by the user during the defined period is equal to the expected number of authentication factors for the user for the defined period, the user is identified as not having committed a bypass of the authentication system of the web application during the defined period.

In some implementations, a score for the user is generated based on the user's conformation with one or more categories of web browsing behavior (412). In some examples, the one or more categories of web browsing behavior include accessing anomalous URLs, accessing foreign IP addresses, accessing blacklisted IP addresses, committing multiple bypasses, flagging of the user as having previously committed a bypass, or failing to provide any valid authentication information during the defined time period.

In some implementations, the user's score is calculated based on the number of categories of suspicious activities (e.g., multiple bypasses, blacklisted IP addresses, etc.) corresponding with the user. For example, if the one or more webpage log entries and authentication logs entries corresponding with the user indicate that the user accessed one or more blacklisted IP addresses and committed multiple bypasses, the user's score would be a 2, based on the user having committed two types of suspicious activities. In some examples, the score for the user is calculated based on the number of individual instances of suspicious activity corresponding with the user. For example, if the webpage logs and the authentication logs indicate that the user has accessed two blacklisted IP addresses and committed three bypasses during the defined period, the user's score would be 5, based on the five instances of suspicious activity corresponding with the user. In some instances, a score above a threshold score indicates a high likelihood of authentication bypass. In some implementations, the scores for each bypassing user is contained in a summary report (such as bypass summary 336 of FIG. 3).

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for detecting bypass of an authentication system of a web application, the method being executed by one or more processors and comprising:
   receiving one or more webpage logs comprising web traffic associated with a web application during a defined time period;
   receiving one or more authentication logs associated with one or more authentication appliances providing authentication services for the web application, the one or more authentication logs comprising one or more time-stamped authentication factor entries for the one or more authentication appliances;
   determining, based on the one or more webpage logs, one or more webpage log entries corresponding to a user and the defined time period;
   determining, based on the one or more authentication logs, a total number of correct authentication factors provided by the user during the defined time period; and
   determining, based on the one or more webpage log entries corresponding to the user and the defined time period and the total number of correct authentication factors provided by the user, that the user bypassed an authentication system of the web application, wherein determining that the user bypassed the authentication system of the web application comprises:
      determining an expected number of authentication factors for the user for the defined time period; and
      determining that the total number of correct authentication factors provided by the user during the defined time period is less than the expected number of authentication factors for the user for the defined time period.

2. The method of claim 1, wherein each authentication log entry corresponding to the user indicates a correct authentication factor provided by the user.

3. The method of claim 1, wherein determining the expected number of authentication factors for the user for the defined time period comprises:
   determining, based on the one or more webpage log entries corresponding to the user and the defined time period, one or more uniform resource locators (URLs) associated with the web application and accessed by the user during the defined time period;
   obtaining one or more tables, each of the one or more tables comprising a mapping between each of the one or more URLs and a number of authentication factors required for the user to access to each of the one or more URLs; and
   determining, based on the one or more URLs and the one or more tables, the expected number of authentication factors for the user for the defined time period.

4. The method of claim 3, wherein the number of authentication factors required for the user to access to each of the one or more URLs and a type of authentication factors required for the user to access to each of the one or more URLs are controllable by the user.

5. The method of claim 1, further comprising:
   generating a score for the user based on the user's conformance with one or more categories of web browsing behavior.

6. The method of claim 5, wherein the one or more categories of web browsing behavior comprise at least one of multiple bypasses, anomalous URLs, previous flagging of the user, blacklisted Internet protocol address, foreign Internet protocol address, and failure to provide any valid authentication information.

7. The method of claim 5, wherein conformance with at least one of the one or more categories of web browsing behavior indicates an intentional bypass of the authentication system of the web application.

8. A non-transitory computer-readable storage medium coupled to one or more processors and having instructions stored thereon which, when executed by the one or more processors, cause the one or more processors to perform operations for detecting bypass of an authentication system of a web application, the operations comprising:
   receiving one or more webpage logs comprising web traffic associated with a web application during a defined time period;
   receiving one or more authentication logs associated with one or more authentication appliances providing authentication services for the web application, the one or more authentication logs comprising one or more time-stamped authentication factor entries for the one or more authentication appliances;
   determining, based on the one or more webpage logs, one or more webpage log entries corresponding to a user and the defined time period;
   determining, based on the one or more authentication logs, a total number of correct authentication factors provided by the user during the defined time period; and
   determining, based on the one or more webpage log entries corresponding to the user and the defined time period and the total number of correct authentication factors provided by the user, that the user bypassed an authentication system of the web application, wherein determining that the user bypassed the authentication system of the web application comprises:
      determining an expected number of authentication factors for the user for the defined time period; and
      determining that the total number of correct authentication factors provided by the user during the defined time period is less than the expected number of authentication factors for the user for the defined time period.

9. The non-transitory computer-readable storage medium of claim 8, wherein each authentication log entry corresponding to the user indicates a correct authentication factor provided by the user.

10. The non-transitory computer-readable storage medium of claim 8, wherein determining the expected number of authentication factors for the user for the defined time period comprises:
   determining, based on the one or more webpage log entries corresponding to the user and the defined time period, one or more uniform resource locators (URLs) associated with the web application and accessed by the user during the defined time period;
   obtaining one or more tables, each of the one or more tables comprising a mapping between each of the one or more URLs and a number of authentication factors required for the user to access to each of the one or more URLs; and
   determining, based on the one or more URLs and the one or more tables, the expected number of authentication factors for the user for the defined time period.

11. The non-transitory computer-readable storage medium of claim 10, wherein the number of authentication factors required for the user to access to each of the one or more URLs and a type of authentication factors required for the user to access to each of the one or more URLs are controllable by the user.

12. The non-transitory computer-readable storage medium of claim 8, further comprising:
generating a score for the user based on the user's conformance with one or more categories of web browsing behavior.

13. The non-transitory computer-readable storage medium of claim 12, wherein the one or more categories of web browsing behavior comprise at least one of multiple bypasses, anomalous URLs, previous flagging of the user, blacklisted Internet protocol address, foreign Internet protocol address, and failure to provide any valid authentication information.

14. The non-transitory computer-readable storage medium of claim 12, wherein conformance with at least one of the one or more categories of web browsing behavior indicates an intentional bypass of the authentication system of the web application.

15. A system, comprising:
one or more processors; and
a computer-readable storage device coupled to the one or more processors and having instructions stored thereon which, when executed by the one or more processors, cause the one or more processors to perform operations for detecting bypass of an authentication system of a web application, the operations comprising:
receiving one or more webpage logs comprising web traffic associated with a web application during a defined time period;
receiving one or more authentication logs associated with one or more authentication appliances providing authentication services for the web application, the one or more authentication logs comprising one or more time-stamped authentication factor entries for the one or more authentication appliances;
determining, based on the one or more webpage logs, one or more webpage log entries corresponding to a user and the defined time period;
determining, based on the one or more authentication logs, a total number of correct authentication factors provided by the user during the defined time period; and
determining, based on the one or more webpage log entries corresponding to the user and the defined time period and the total number of correct authentication factors provided by the user, that the user bypassed an authentication system of the web application, wherein determining that the user bypassed the authentication system of the web application comprises:
determining an expected number of authentication factors for the user for the defined time period; and
determining that the total number of correct authentication factors provided by the user during the defined time period is less than the expected number of authentication factors for the user for the defined time period.

16. The system of claim 15, wherein each authentication log entry corresponding to the user indicates a correct authentication factor provided by the user.

17. The system of claim 15, wherein determining the expected number of authentication factors for the user for the defined time period comprises:
determining, based on the one or more webpage log entries corresponding to the user and the defined time period, one or more uniform resource locators (URLs) associated with the web application and accessed by the user during the defined time period;
obtaining one or more tables, each of the one or more tables comprising a mapping between each of the one or more URLs and a number of authentication factors required for the user to access to each of the one or more URLs; and
determining, based on the one or more URLs and the one or more tables, the expected number of authentication factors for the user for the defined time period.

18. The system of claim 17, wherein the number of authentication factors required for the user to access to each of the one or more URLs and a type of authentication factors required for the user to access to each of the one or more URLs are controllable by the user.

19. The system of claim 15, further comprising:
generating a score for the user based on the user's conformance with one or more categories of web browsing behavior.

20. The system of claim 19, wherein the one or more categories of web browsing behavior comprise at least one of multiple bypasses, anomalous URLs, previous flagging of the user, blacklisted Internet protocol address, foreign Internet protocol address, and failure to provide any valid authentication information.

* * * * *